(12) United States Patent
Sato (10) Patent No.: US 10,081,353 B2
(45) Date of Patent: Sep. 25, 2018

(54) CONTROL DEVICE FOR VEHICLE (71) Applicant: TOYOTA JIDOSHA KABUSHIKI KAISHA, Toyota-shi, Aichi-ken (JP)

(72) Inventor: Daiki Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 15/390,311

(22) Filed: Dec. 23, 2016

(65) Prior Publication Data
US 2017/0197610 A1 Jul. 13, 2017

(30) Foreign Application Priority Data

Jan. 13, 2016 (JP) .................. 2016-004814

(51) Int. Cl.
| | |
|---|---|
| *B60W 20/14* | (2016.01) |
| *B60W 20/30* | (2016.01) |
| *B60W 30/18* | (2012.01) |
| *B60K 6/365* | (2007.10) |
| *B60K 6/445* | (2007.10) |
| *B60W 10/06* | (2006.01) |
| *B60W 10/08* | (2006.01) |
| *B60W 10/10* | (2012.01) |

(Continued)

(52) U.S. Cl.
CPC ............ *B60W 20/14* (2016.01); *B60K 6/365* (2013.01); *B60K 6/445* (2013.01); *B60W 10/06* (2013.01); *B60W 10/08* (2013.01); *B60W 10/10* (2013.01); *B60W 20/15* (2016.01); *B60W 20/30* (2013.01); *B60W 30/18127* (2013.01); *B60W 30/19* (2013.01); *B60W 2710/244* (2013.01); *Y02T 10/6239* (2013.01); *Y02T 10/6286* (2013.01); *Y02T 10/7258* (2013.01)

(58) Field of Classification Search
CPC ............................. B60W 20/14; B60K 6/365
See application file for complete search history.

(56) References Cited

U.S. PATENT DOCUMENTS

| | | |
|---|---|---|
| 5,942,864 A | 8/1999 | Charreton |
| 2010/0181828 A1 | 7/2010 | Handa et al. |

(Continued)

FOREIGN PATENT DOCUMENTS

| | | |
|---|---|---|
| JP | H08-251983 A | 9/1996 |
| JP | 2002-238108 A | 8/2002 |

(Continued)

*Primary Examiner* — Michael D Lang
(74) *Attorney, Agent, or Firm* — Oliff PLC (57) ABSTRACT

It is determined whether or not an automatic transmission is in a pre-gear shift state determined in advance prior to a power-ON gear shift in which torque-down control is performed. When the automatic transmission is in the pre-gear shift state, since a required free capacity is secured in a capacitor, torque-down control of a second motor generator is performed in a gear shift, and even if surplus power is generated in a power supply circuit due to the torque-down control, the surplus power can be quickly absorbed using the capacitor. Since a required free capacity is secured in the capacitor by determining whether or not the automatic transmission is in the pre-gear shift state, a predetermined free capacity does not need to be secured constantly, normal capacitor storage control focusing on drivability or the like can be performed normally, and use restriction of the capacitor is minimized.

6 Claims, 8 Drawing Sheets

(51) Int. Cl.
*B60W 20/15* (2016.01)
*B60W 30/19* (2012.01)

(56) References Cited

U.S. PATENT DOCUMENTS

2012/0310460 A1 12/2012 Sato et al.
2013/0166131 A1 6/2013 Shiiba et al.

FOREIGN PATENT DOCUMENTS

| | | |
|---|---|---|
| JP | 2007-118726 A | 5/2007 |
| JP | 2009-248811 A | 10/2009 |
| JP | 2009-254161 A | 10/2009 |
| JP | 2010-254102 A | 11/2010 |
| WO | 2009/013891 A1 | 1/2009 |
| WO | 2011/077581 A1 | 6/2011 |
| WO | 2012/032605 A1 | 3/2012 |

|  | B1 | B2 |
|---|---|---|
| LOW-SPEED GEAR STAGE Lo | × | ○ |
| HIGH-SPEED GEAR STAGE Hi | ○ | × |

○ : BRAKE ENGAGEMENT
× : BRAKE DISENGAGEMENT

PRE-CAPACITOR UPPER LIMIT GUARD

POST-CAPACITOR UPPER LIMIT GUARD

FIG. 8

FIG. 9

# CONTROL DEVICE FOR VEHICLE

INCORPORATION BY REFERENCE

The disclosure of Japanese Patent Application No. 2016-004814 filed on Jan. 13, 2016 including the specification, drawings and abstract is incorporated herein by reference in its entirety.

BACKGROUND

1. Technical Field

The present disclosure relates to a control device for a vehicle including an electric motor as a drive power source for traveling, and in particular, to surplus power generated in a power supply circuit during torque-down control in a gear shift of an automatic transmission.

2. Description of Related Art

A vehicle having (a) an electric motor as a drive power source for traveling, (b) an automatic transmission provided between the electric motor and drive wheels, and (c) a power storage device provided in a power supply circuit of the electric motor and configured to be chargeable and dischargeable is widely known. A vehicle described in WO 2011/077581 A is an example of such a vehicle, and relates to a hybrid vehicle including an engine in addition to an electric motor (second electric motor MG2) as a drive power source for traveling, and a battery (secondary battery), such as a lithium-ion battery, is used as a power storage device. In WO 2011/077581 A, while torque-down control for decreasing the torque of the electric motor in a gear shift of the automatic transmission is performed, in order to suppress the generation of surplus power in the power supply circuit due to rapid torque-down, a decrease rate of the electric motor torque is restricted. For example, if the electric motor torque is changed to a regeneration side due to rapid torque-down, while regenerative power is generated and large surplus power is generated in the power supply circuit due to the regenerative power, surplus power cannot be sufficiently absorbed (charged) in a battery having a low charging/discharging rate. For this reason, the down amount or the decrease rate of the electric motor torque is restricted to such an extent that surplus power can be absorbed with the battery.

SUMMARY

However, if the down amount or the decrease rate of the electric motor torque is restricted, for example, gear shift shock may occur or a gear shift time may be extended to cause damage to durability of frictional members, and there is still room for improvement. While a case where surplus power is quickly absorbed using a rapidly chargeable/dischargeable capacitor is considered (non-known), in general, the power storage capacity of the capacitor is small. For this reason, in a case where the free capacity is small, surplus power may still become problematic.

An object is to suppress the generation of surplus power without restricting a torque-down amount or a decrease rate in a case where torque-down control is performed in a gear shift.

A control device for a vehicle according to an aspect of the present disclosure has a following configuration. The vehicle includes an electric motor as a drive power source for traveling, an automatic transmission provided between the electric motor and drive wheels, and a power storage device provided in a power supply circuit of the electric motor and configured to be chargeable and dischargeable. The power storage device includes a battery and a rapid power storage device configured to be chargeable and dischargeable rapider than the battery. The control device includes an electronic control unit configured to: i) perform torque-down control for decreasing torque of the electric motor in a gear shift of the automatic transmission, ii) determine whether or not the automatic transmission is in a pre-gear shift state before the torque-down control is performed in the gear shift of the automatic transmission, and iii) in a case where the electronic control unit determines that the automatic transmission is in the pre-gear shift state, execute control for securing a predetermined free capacity in the rapid power storage device in order to absorb surplus power generated in the power supply circuit due to the torque-down control using the rapid power storage device. Since the battery is a secondary battery, such as a lead battery, a lithium-ion battery, or a nickel-hydrogen battery, and is charged or discharged using a chemical reaction, a charging/discharging rate thereof is restricted. The rapid power storage device is chargeable and dischargeable rapider than such a battery, and is a capacitor, a flywheel power storage device, or the like.

According to the control device for a vehicle, since it is determined whether or not the automatic transmission is in the pre-gear shift state before the torque-down control is performed in the gear shift of the automatic transmission, and in a case where it is determined that the automatic transmission is in the pre-gear shift state, surplus power generated in the power supply circuit due to the torque-down control is absorbed using the rapid power storage device, the predetermined free capacity is secured in the rapid power storage device. For this reason, even in a case where the torque-down control of the electric motor is performed in the gear shift, and surplus power is generated in the power supply circuit due to the torque-down control, surplus power can be quickly absorbed using the rapid power storage device. With this, it is possible to relax or eliminate the restriction to the down amount or the decrease rate of the electric motor torque during the torque-down control, and to appropriately perform gear shift control so as to prevent deterioration of durability of frictional members due to the occurrence of gear shift shock or the extension of the gear shift time.

Since the free capacity is secured in the rapid power storage device by determining whether or not the automatic transmission is in the pre-gear shift state, the predetermined free capacity does not need to be constantly secured, and normally, the rapid power storage device can be sufficiently charged. With this, the use restriction (storage amount restriction) of the rapid power storage device is minimized, and for example, large assist torque can be quickly generated by supplying electric power from the rapid power storage device to the electric motor with high output at the time of start, rapid acceleration, or the like. In this way, the characteristics of the rapidly chargeable/dischargeable rapid power storage device are utilized appropriately for various other purposes.

In the control device described above, the electronic control unit may have a map of a pre-gear shift region set adjacent to a gear shift line determined with a vehicle speed and a required drive power as parameters, and the electronic control unit may be configured to determine that the automatic transmission is in the pre-gear shift state when the vehicle speed and the required drive power fall within a range of the pre-gear shift region.

According to the above-described control device, since the map of the pre-gear shift region set adjacent to the gear shift line is provided, and the electronic control unit determines that the automatic transmission is in the pre-gear shift state when the vehicle speed and the required drive power fall within a range of the pre-gear shift region, thus it is possible to determine the pre-gear shift state easily and reliably, and to appropriately secure the free capacity before the gear shift.

In the control device described above, the electronic control unit may be configured to perform control such that a chargeable upper limit value of the rapid power storage device decreases in order to secure the free capacity.

According to the above-described control device, since the chargeable upper limit value of the rapid power storage device decreases in order to secure the free capacity, in a case where the storage residual amount is small originally, wasteful discharging or the like is not performed.

In the control device described above, the electronic control unit may be configured to perform control such that the rapid power storage device is discharged in order to secure the free capacity.

According to the above-described control device, since the rapid power storage device is discharged in order to secure the free capacity, it is possible to quickly secure a necessary free capacity. With this, it is possible to relax a temporal use restriction of the rapid power storage device.

In the control device described above, the electronic control unit may be configured to set the free capacity of the rapid power storage device based on a charging performance and the free capacity of the battery in order to absorb the surplus power of the power supply circuit using both of the battery and the rapid power storage device.

According to the above-described control device, since surplus power is absorbed using both of the battery and the rapid power storage device, it is possible to reduce the free capacity of the rapid power storage device in the gear shift, and a quantitative use restriction of the rapid power storage device is relaxed.

In the control device described above, the power storage device may include a third power storage device in addition to the battery and the rapid power storage device, and the electronic control unit may be configured to set the free capacity of the rapid power storage device based on a charging performance and the free capacity of the third power storage device in order to absorb the surplus power of the power supply circuit using both of the third power storage device and the rapid power storage device.

According to the above-described control device, in a case where the third power storage device is provided in addition to the battery and the rapid power storage device, since surplus power is absorbed using both of the third power storage device and the rapid power storage device, the free capacity of the rapid power storage device in the gear shift can be reduced, and the quantitative use restriction of the rapid power storage device is relaxed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The present disclosure is suitably applied to a hybrid vehicle including an engine in addition to an electric motor as a drive power source for traveling, but can be applied to other vehicles, such as an electric vehicle, including only an electric motor as a drive power source for traveling. As the electric motor, a motor generator which can be subjected to powering control for generating a drive power and regenerative control for generating electric power with driven rotation is suitably used, but it should suffice that at least powering control for generating a drive power can be performed. An automatic transmission which is provided between the electric motor and drive wheels is a transmission which automatically performs a gear shift according to an operation state, such as a vehicle speed and a required drive power, or automatically performs a gear shift in response to a driver's gear shift command, such as an up/down gear shift command or a gear stage selection command, and a stepped transmission, such as a planetary gear type, or a continuously variable transmission, such as a belt type, can be used.

The present disclosure is suitably applied, for example, in a case where torque-down control for decreasing an electric motor rotation speed is performed in a power-ON (drive state) up-shift or in a case where the torque-down control is performed in a power-ON down-shift immediately before the electric motor rotation speed reaches a synchronous rotation speed after a gear shift. The present disclosure may be merely applied to either of these gear shifts.

It is possible to determine whether or not the automatic transmission is a pre-gear shift state, for example, according to whether or not the vehicle speed and the required drive power fall within a range of a pre-gear shift region set adjacent to a gear shift line. The determination regarding whether or not the automatic transmission is in the pre-gear shift state is performed in order to secure a predetermined free capacity in a rapid power storage device before a gear shift (strictly, before the torque-down control is performed). While a free capacity may be secured in a comparatively early stage before a gear shift, if a temporal use restriction of the rapid power storage device is considered, it is preferable that the time is as short as possible within a range capable of securing a free capacity. For example, a required time necessary for securing a predetermined free capacity based on a dischargeable amount per unit time of the rapid power storage device is calculated, and a required time until reaching the gear shift line is calculated based on a drive power, a vehicle weight, and the like, whereby the pre-gear shift region capable of securing the predetermined free capacity through discharging is determined in advance. While the pre-gear shift region may be set variably according to a necessary free capacity or a current free capacity, a given region may be determined according to a maximum free capacity. The pre-gear shift region may be set variably in consideration of a road gradient or the like.

The pre-gear shift determination unit may sequentially determine whether or not the automatic transmission is in the pre-gear shift state based on an operation, such as change in vehicle speed (acceleration/deceleration) or a rate of change in accelerator operation amount. For example, a required time until reaching the gear shift line may be calculated from change in vehicle speed or the rate of change in accelerator operation amount, and in a case where the calculated time becomes equal to or less than a free capacity securing time necessary for securing a predetermined free capacity in the rapid power storage device, it may be determined that the automatic transmission is in the pre-gear shift state. While the free capacity securing time may be set to a given value determined in advance according to the dischargeable amount per unit time of the rapid power storage device and the maximum free capacity, the free capacity securing time may be determined by sequential calculation using the necessary free capacity or the current free capacity. In a case where a gear shift is performed in response to the driver's gear shift command, in general, since there is a delay time until the gear shift is performed actually by hydraulic control or the like from the gear shift command, it is determined whether or not the automatic transmission is in the pre-gear shift state based on the presence or absence of the gear shift command, and thereafter, the predetermined free capacity can be secured.

The necessary free capacity corresponds to the amount of surplus power generated during the torque-down control in the gear shift, and for example, may be determined in advance by an experiment, a simulation, or the like based on the amount of regenerative power generated by the regenerative control in a case where the electric motor is subjected to regenerative control through the torque-down control, or may be determined by calculation using the electric motor rotation speed, regenerative torque, and the like. Even in a case where the torque-down control is performed within a range of the powering torque of the electric motor, change in the output (discharge) of the battery cannot does not follow a rapid decrease in power consumption of the electric motor, and thus, surplus power is likely to be generated. The surplus power can be determined in advance by an experiment, a simulation, or the like. Since a power consumption decrease amount increases in a case where the electric motor rotation speed is high and the torque-down amount is large, it is preferable that a value where a product thereof becomes the maximum is used. In a case where a plurality of electric motors is provided, the amount of regenerative power thereof may be added or the power consumption decrease amount may be added. While the amount of surplus power, that is, the necessary free capacity can be determined by adding the power consumption decrease amount and the amount of regenerative power, for example, in a case where the amount of surplus amount due to a decrease in power consumption is small or substantially zero, the amount of surplus power may be determined from the amount of regenerative power only, or in a case where the torque-down control is performed within a range of powering torque, the amount of surplus power may be determined from the power consumption decrease amount only. The entire surplus power generated due to the torque-down control does not need to be absorbed by the rapid power storage device, at least a part of surplus power may be absorbed using the rapid power storage device, or a part of surplus power may remain in the power supply circuit, or may be absorbed using another power storage device. In regard to the amount of surplus power, that is, the necessary free capacity, while a constant value may be determined regardless of the type of gear shift, it is preferable that the necessary free capacity is set for each type of gear shift, such as an up-shift, a down-shift, or a gear stage for making the free capacity as small as possible. An operation point of the electric motor at the time of a gear shift may be predicted from the driver's required drive power and the vehicle speed, and a maximum amount of regenerative power or a maximum power consumption decrease amount at the operation point may be sequentially calculated as the amount of surplus power.

While the free capacity securing control unit may merely decrease a chargeable upper limit value of the rapid power storage device to restrict charging, for quickly securing the free capacity, it is preferable that the rapid power storage device is discharged and the storage residual amount decreases quickly. As the discharging method, electric power is transferred from the rapid power storage device to another power storage device, such as a battery, or electric power of the rapid power storage device is used as a drive electric power of the electric motor, or is used as a drive electric power of accessories, such as an air conditioner.

The control device for a vehicle of the present disclosure includes a third power storage device in addition to the battery and the rapid power storage device, and surplus power is absorbed using both of the third power storage device and the rapid power storage device. The third power storage device may be a battery, such as a lithium-ion battery or a nickel-hydrogen battery, or may be a capacitor or the like.

Figure 1:
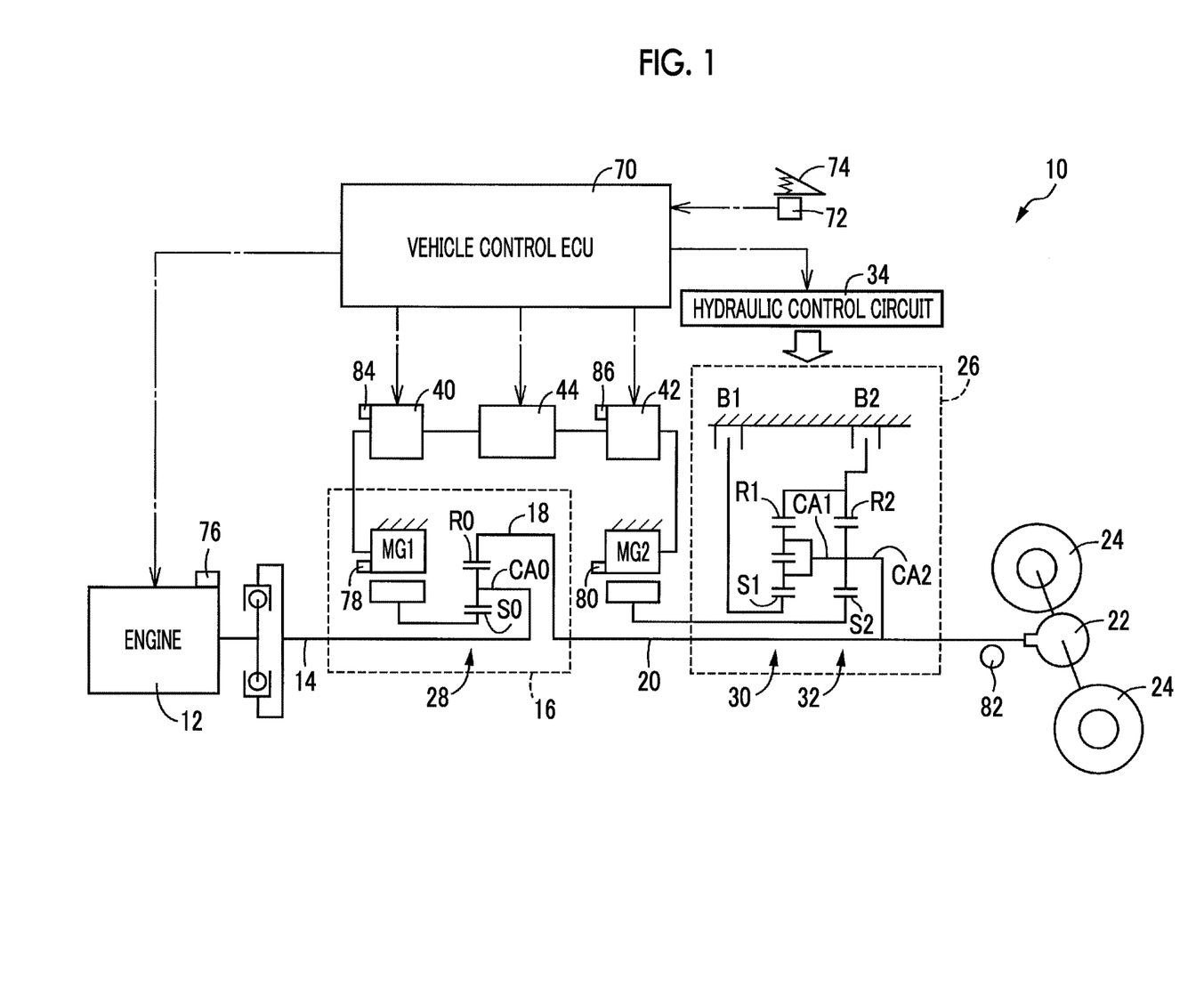
FIG. 1 is a schematic view of a drive system of a hybrid vehicle to which the present disclosure is applied, and is a diagram including a main part of a control system.

Hereinafter, an example of the present disclosure will be described in detail referring to the drawings. FIG. 1 is a schematic view of a drive system of a hybrid vehicle 10 to which the invention is applied, and the drive system includes an engine 12, an electric differential mechanism 16 coupled to the engine 12 through an input shaft 14, an output shaft 20 coupled to a transmission member 18 of the electric differential mechanism 16, and a pair of drive wheels 24 to which a drive power is transmitted from the output shaft 20 through a differential gear device (final reduction gear device) 22. A second motor generator MG2 is connected to the output shaft 20 through an automatic transmission 26. The engine 12 is a first drive power source for traveling and an internal combustion engine which generates power through fuel combustion, such as a gasoline engine or a diesel engine, and is operated on, for example, an optimum fuel consumption line by a vehicle control electronic control unit (ECU) 70.

The electric differential mechanism 16 is primarily constituted of a single pinion type planetary gear device 28, and includes a sun gear S0, a carrier CA0, and a ring gear R0. The carrier CA0 is a first rotating element which is coupled to the engine 12 through the input shaft 14, the sun gear S0 is a second rotating element which is coupled to a first motor generator MG1, and the ring gear R0 is a third rotating element which is coupled to the transmission member 18. The sun gear S0, the carrier CA0, and the ring gear R0 are relatively rotatable, an output of the engine 12 is distributed to the first motor generator MG1 and the transmission member 18, a differential state of the electric differential mechanism 16 can be appropriately changed by controlling a rotation speed (MG1 rotation speed) NMG1 of the first motor generator MG1, that is, a rotation speed of the sun gear S0, and a gear shift ratio γ0 (=NE/Nout) of an engine rotation speed NE that is a rotation speed of the input shaft 14 to a rotation speed (output rotation speed) Nout of the transmission member 18 is continuously changed. The first motor generator MG1 can be subjected to powering control for generating a drive power and regenerative control for generating electric power with driven rotation, and an MG1 inverter 40 is controlled by the vehicle control ECU 70, whereby the first motor generator MG1 is selectively used as an electric motor or a power generator and powering torque or regenerative torque is controlled. Since the first motor generator MG1, the electric differential mechanism 16, the second motor generator MG2, and the automatic transmission 26 are substantially symmetrically constituted with respect to the shaft center, only an upper half of the shaft center is shown in FIG. 1.

Figure 2:
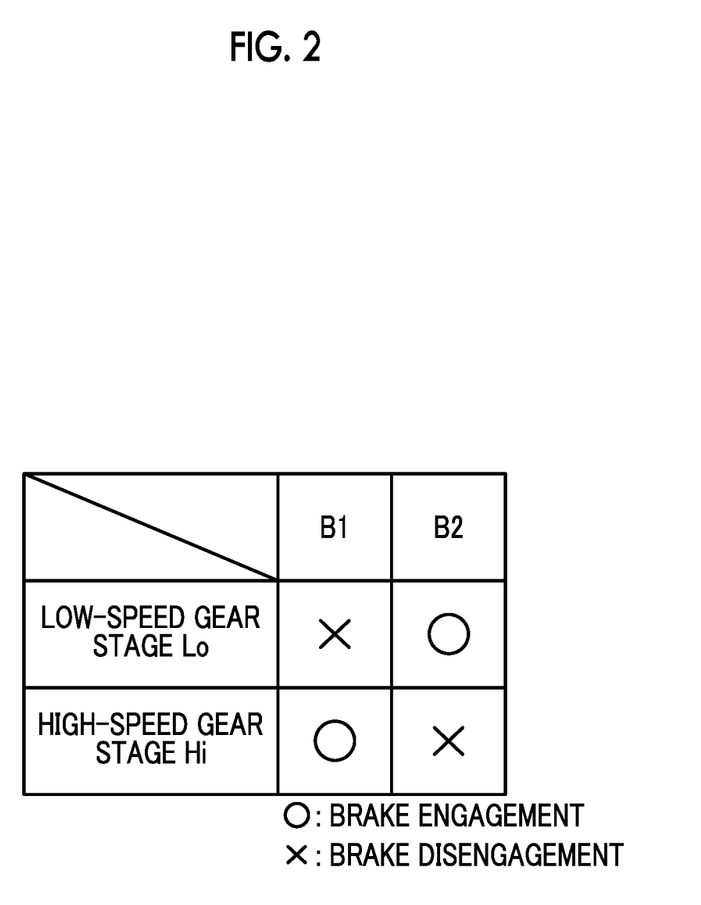
FIG. 2 is a diagram illustrating gear stages of an automatic transmission provided in the hybrid vehicle of FIG. 1 and engagements for establishing the gear stages.

The second motor generator MG2 is a second drive power source for traveling and can be subjected to powering control for generating a drive power and regenerative power for generating electric power with driven rotation, and an MG2 inverter 42 is controlled by the vehicle control ECU 70, whereby the second motor generator MG2 is selectively used as an electric motor or a power generator and powering torque or regenerative torque is controlled. The second motor generator MG2 is an electric motor of the present disclosure. The automatic transmission 26 is a planetary gear type stepped transmission, and in this example, is primarily constituted of a double pinion type first planetary gear device 30 having a sun gear S1, a carrier CAL and a ring gear R1 and a single pinion type second planetary gear device 32 having a sun gear S2, a carrier CA2, and a ring gear R2. The sun gear S1 is selectively rotationally stopped by a brake B1, and the carriers CA1, CA2 are coupled to each other and are coupled to the output shaft 20, and the ring gears R1, R2 are coupled to each other and are selectively rotationally stopped by a brake B2. The sun gear S2 is coupled to the second motor generator MG2. The brakes B1, B2 are hydraulic frictional engagement devices and are subjected to engagement and disengagement control by the vehicle control ECU 70 through a hydraulic control circuit 34, and as shown in FIG. 2, a high-speed gear state Hi and a low-speed gear stage Lo are established. The hydraulic control circuit 34 includes, for example, linear solenoid valves or the like corresponding to the brakes B1, B2 and can individually turn on (supply) or off (shut-off) the hydraulic pressures of the brakes B1, B2, or continuously change engagement torque by continuously changing the supply hydraulic pressures, and a gear shift can be smoothly performed such that gear shift shock does not occur.

In FIG. 2, the brake B1 is engaged and the brake B2 is disengaged, whereby the high-speed gear stage Hi in which a gear shift ratio γs (=NMG2/Nout) of a rotation speed (MG2 rotation speed) NMG2 of the second motor generator MG2 and the output rotation speed Nout is greater than 1.0, and the brake B2 is engaged and the brake B1 is disengaged, whereby the low-speed gear stage Lo in which the gear shift ratio γs is still greater than the high-speed gear stage Hi is established. Since both of the gear shift ratios γs are greater than 1.0 and the torque of the second motor generator MG2 is amplified and transmitted to the output shaft 20, the low-capacity and small second motor generator MG2 can be employed. Both of the brakes B1, B2 are disengaged, whereby the second motor generator MG2 can be separated from a drive power transmission path.

Figure 3:
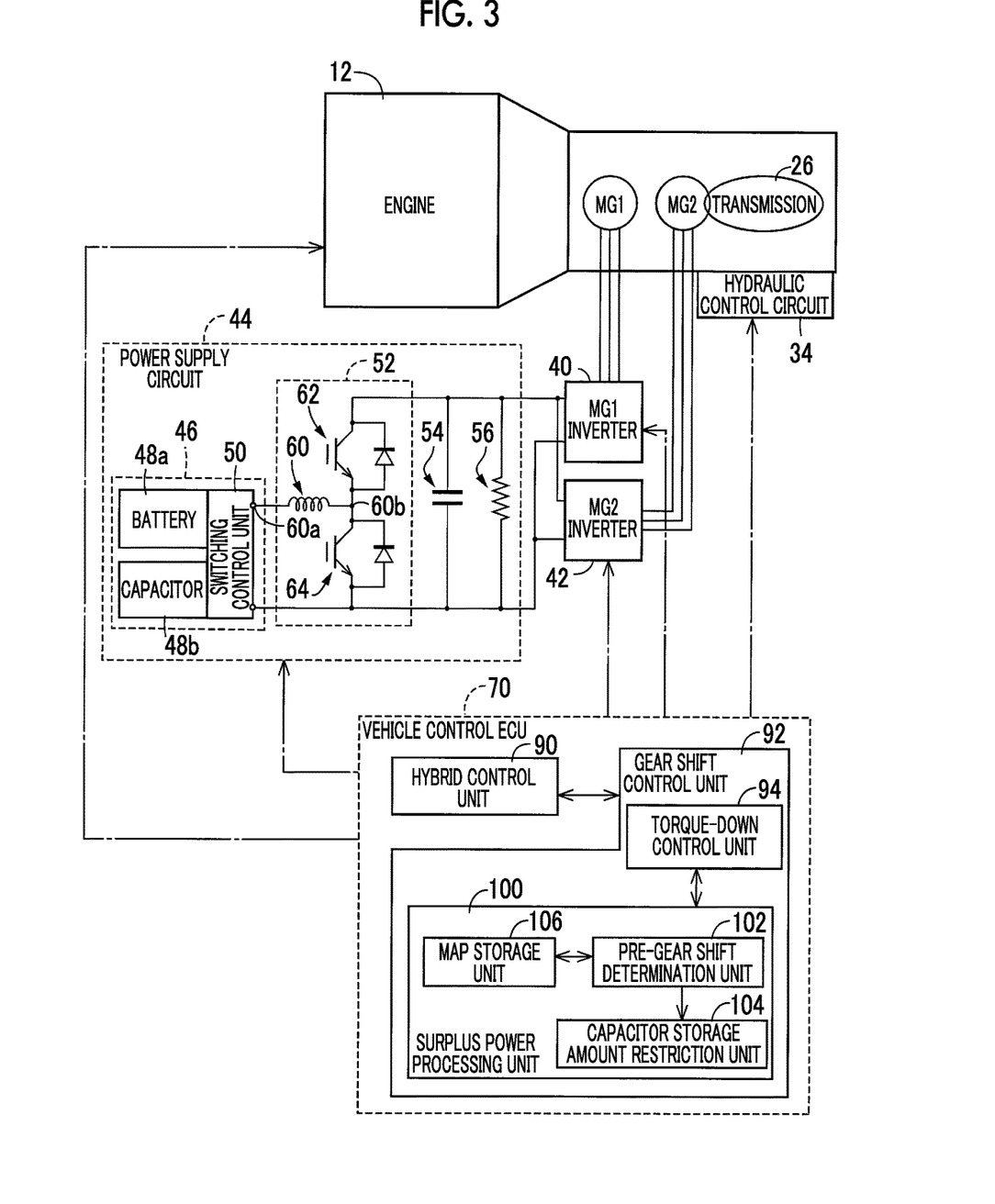
FIG. 3 is a diagram illustrating a power supply circuit provided in the hybrid vehicle of FIG. 1 and is a diagram including a block diagram of various functions of a vehicle control ECU.

A power supply circuit 44 is connected to the MG1 inverter 40 and the MG2 inverter 42. The power supply circuit 44 is the same as a power supply device, and as shown in FIG. 3, includes a power storage device 46, a voltage converter (DC/DC converter) 52, a smoothing capacitor 54, and a discharge resistor 56. The power storage device 46 includes a battery 48a, such as a lead battery, a lithium-ion battery, or a nickel-hydrogen battery, as a capacitance type power storage device having large storage capacity, an electric double layer type capacitor 48b as a high output type power storage device chargeable and dischargeable rapider than the battery 48a, and a switching control unit 50. The large-capacity battery 48a is a main power storage device which supplies a drive electric power to the motor generators MG1, MG2, or stores electric power generated by the regenerative control of the motor generators MG1, MG2. The high output type capacitor 48b supplies electric power to the second motor generator MG2, for example, in a case where a large drive power is required, such as at the time of start, rapid acceleration, or the like of the vehicle, whereby large assist torque can be quickly generated. The capacitor 48b corresponds to a rapid power storage device.

The switching control unit 50 switches a connection state of the voltage converter 52 and each of the battery 48a and the capacitor 48b in response to a switching control signal supplied from the vehicle control ECU 70, includes a switching element, such as a field effect transistor, and is constituted, for example, as described in JP 2007-118726 A, thereby connecting only either of the battery 48a or the capacitor 48b to the voltage converter 52 or to connect both of the battery 48a and the capacitor 48b to the voltage converter 52. For example, electric power can be supplied to one or both of the first motor generator MG1 and the second motor generator MG2 using one or both of the battery 48a and the capacitor 48b. The switching control unit 50 is subjected to switching control such that one or both of the battery 48a and the capacitor 48b are charged with power supply from one or both of the first motor generator MG1 and the second motor generator MG2. Furthermore, the switching control unit 50 is subjected to switching control such that the battery 48a and the capacitor 48b can be charged and discharged with mutual power supply.

The voltage converter 52 includes a reactor 60 and two switching elements 62, 64, and is a booster/debooster circuit which boosts a voltage on the power storage device 46 side at the time of drive (powering) and supplies the voltage to the inverters 40, 42 side, and deboosts a voltage on the inverters 40, 42 at the time of regeneration and supplies the voltage to the power storage device 46 side. A positive electrode and a negative electrode of the voltage converter 52 are respectively connected to a positive electrode bus bar and a negative electrode bus bar of the two inverters 40, 42. The reactor 60 is a device which has one end 60a connected to a positive electrode of the power storage device 46 and the other end 60b connected to a connection point between the two switching elements 62, 64 connected in series with each other, and can store magnetic energy. The reactor 60 is provided with a coil wound around a core as a magnetic body, is used as inductance when a high frequency signal flows in the coil, and can constitute the booster/debooster circuit along with the switching elements 62, 64.

The switching elements 62, 64 are large power switching transistors which are connected in series with each other and are disposed between the positive electrode bus bar and the negative electrode bus bar of the inverters 40, 42. The connection point between the two switching elements 62, 64 is connected to the other end 60*b* of the reactor 60 as described above. The switching elements 62, 64 are, for example, a gate insulation type bipolar transistors. In FIG. 3, while the switching elements 62, 64 are shown as an n-channel type, the switching elements 62, 64 may be of a p-channel type with the voltage relationship. Diodes are respectively connected in parallel with the two switching elements 62, 64.

Of the two switching elements 62, 64, one switching element 62 has a collector terminal connected to the positive electrode bus bar of the inverters 40, 42, an emitter terminal connected to a collector terminal of the other switching element 64, and a gate terminal connected to a control signal line from the vehicle control ECU 70 as a control terminal. The other switching element 64 has a collector terminal connected to the emitter terminal of the switching element 62 as described above, an emitter terminal connected to the power storage device 46 and the inverters 40, 42 through the common negative electrode bus bar, and a gate terminal connected to the control signal line from the vehicle control ECU 70 as a control terminal.

In a case where the voltage converter 52 performs a booster operation, a switching state where the switching element 62 is turned off and the switching element 64 is alternately and repeatedly turned on and off is brought. In this switching state, the on and off states are repeated in a cycle of about hundreds of thousands of times per second. In such a state, while the switching element 64 is turned on, the other end 60*b* of the reactor 60 is connected to the negative electrode bus bar, current flows in the reactor 60, and resultant energy is stored in the reactor 60. Then, at the moment the switching element 64 is switched from on to off, the stored energy is discharged from the reactor 60, and the voltage at the other end 60*b* of the reactor 60 increases. When this happens, since the other end 60*b* of the reactor 60 is connected to the smoothing capacitor 54 through the diode connected in parallel with the switching element 62, if the voltage at the other end 60*b* is higher than a terminal voltage (smoothing capacitor voltage) Vcon of the smoothing capacitor 54, the smoothing capacitor 54 is charged and the smoothing capacitor voltage Vcon increases. The on and off states of the switching element 64 are alternately repeated in this way, whereby the smoothing capacitor voltage Vcon, that is, a voltage on a secondary side increases. Then, if the voltage on the secondary side becomes equal to or higher than a secondary side reference voltage determined in advance, the switching element 64 is switched off, and on the contrary, if the voltage on the secondary side falls below the secondary side reference voltage, the switching element 64 is brought into the above-described switching state. In this way, since the voltage converter 52 performs the booster operation, if a load on the secondary side fluctuates rapidly, it may not be possible to follow the load fluctuation. For example, if the power consumption of the inverters 40, 42 significantly rapidly decreases, switching of the switching element 64 from the switching state to off may be delayed and the voltage on the secondary side may temporarily increase.

The smoothing capacitor 54 is provided in parallel with the inverters 40, 42 between the inverters 40, 42 and the voltage converter 52, and includes a function of suppressing a high voltage side of the voltage converter 52, that is, voltage fluctuation (pulsation) on the inverters 40, 42 side. In other words, the smoothing capacitor 54 is a capacitor connected to the inverters 40, 42 on the power storage device 46 side in order to smooth an input voltage from the power storage device 46 to the inverters 40, 42, that is, an input voltage from the voltage converter 52 to the inverters 40, 42.

The discharge resistor 68 is a resistive element which is used when the operation of the power supply circuit 44 is stopped and electric energy stored in the smoothing capacitor 54 is discharged.

The vehicle control ECU 70 is a controller which performs output control of the engine 12, perform powering and regenerative control of the first motor generator MG1 and the second motor generator MG2, performs switching control of the switching control unit 50, or performs gear shift control of the automatic transmission 26, includes a so-called microcomputer having a CPU, a ROM, a RAM, an input/output interface, and the like, and performs predetermined signal processing according to a program stored in the ROM while using a temporarily storage function of the RAM. The vehicle control ECU 70 may be divided into a plurality of ECUs for engine control, motor control, power supply circuit control, gear shift control, and the like. To the vehicle control ECU 70, a signal representing an accelerator operation amount Acc as an operation amount of an accelerator pedal 74 from an accelerator operation amount sensor 72 is supplied as shown in FIG. 1, and various kinds of information necessary for control, such as the engine rotation speed NE, the rotation speed (MG1 rotation speed) NMG1 of the first motor generator MG1, the rotation speed (MG2 rotation speed) NMG2 of the second motor generator MG2, a vehicle speed V, a storage residual amount SOC1 of the battery 48*a*, and a storage residual amount SOC2 of the capacitor 48*b*, are supplied from an engine rotation speed sensor 76, an MG1 rotation speed sensor 78, an MG2 rotation speed sensor 80, a vehicle speed sensor 82, an SOC1 sensor 84, an SOC2 sensor 86, and the like. The vehicle speed V corresponds to the above-described output rotation speed Nout. The storage residual amounts SOC1, SOC2 may be calculated by sequentially integrating the charging/discharging amount.

The vehicle control ECU 70 functionally includes a hybrid control unit 90 and a gear shift control unit 92 as shown in FIG. 3. The hybrid control unit 90 operates the engine 12, for example, in an operation region with satisfactory fuel efficiency, and controls distribution of the drive power of the engine 12 and the second motor generator MG2 or reactive force due to power generation of the first motor generator MG1 to changes the gear shift ratio γ0 of the electric differential mechanism 16 continuously. For example, at the traveling vehicle speed V at this time, a target (required) output of the vehicle is calculated from the accelerator operation amount Acc or the vehicle speed V as the driver's required drive power, a required total target output is calculated from the target output of the vehicle and a charging request value, and a target engine output (required engine output) is calculated in consideration of a transmission loss, an accessory load, the assist torque of the second motor generator MG2, and the like such that the total target output is obtained. Then, the engine 12 is controlled so as to become the engine rotation speed NE and engine torque TE at which the target engine output is obtained, and a power generation amount (regenerative torque) of the first motor generator MG1 is controlled.

In a case where high output is required, such as at the time of acceleration, the second motor generator MG2 is used as a drive power source for traveling in addition to the engine 12 as necessary, and is subjected to powering control with power supply from at least the large-capacity battery 48a to generate assist torque. In addition, a motor traveling mode in which the engine 12 is stopped and only the second motor generator MG2 is used as drive power source for traveling, a charging traveling mode in which the vehicle travels using the second motor generator MG2 as a drive power source for traveling while generating electric power by the first motor generator MG1 with power of the engine 12, and the like can be executed. During deceleration traveling when the brake is depressed, the first motor generator MG1 and/or the second motor generator MG2 are subjected to regenerative control, whereby the battery 48a and/or the capacitor 48b can be charged with power generation while a predetermined braking force is generated.

Figure 5:
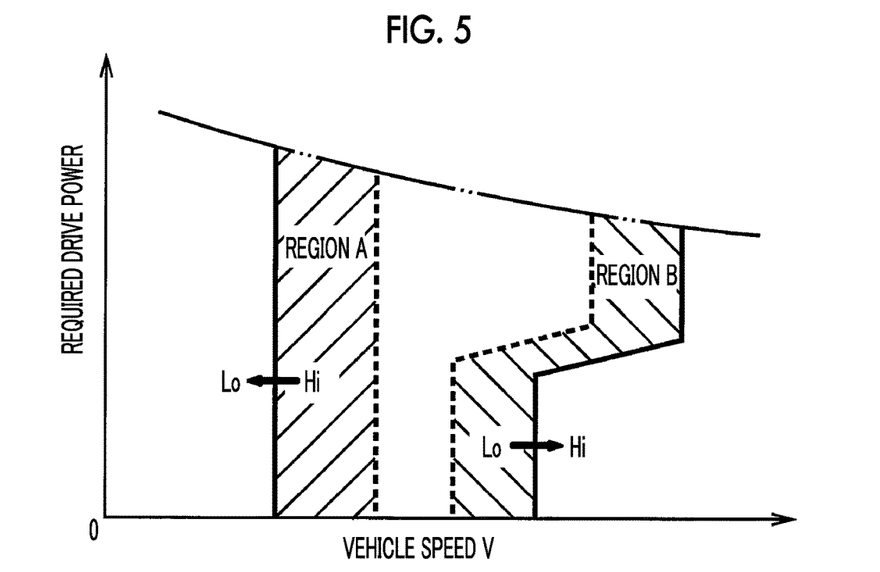
FIG. 5 is a diagram illustrating an example of a map for use when determining whether or not the automatic transmission is an a pre-gear shift state in Step S2 of FIG. 4.

The gear shift control unit 92 automatically switches the gear stage of the automatic transmission 26 according to the operation state. For example, in order to maintain the operation efficiency of the second motor generator MG2 in a satisfactory state, after the vehicle speed V becomes equal to or higher than a predetermined vehicle speed, the gear shift control unit 92 switches the gear stage to the high-speed gear stage Hi having a small gear shift ratio γs to decrease the MG2 rotation speed NMG2, and after the vehicle speed V becomes equal to or lower than the predetermined vehicle speed, the gear shift control unit 92 switches the gear stage to the low-speed gear stage Lo with a large gear shift ratio γs to increase the MG2 rotation speed NMG2. Solid lines of FIG. 5 are an example of a gear shift map, and are determined with the vehicle speed V and the required drive power (accelerator operation amount Acc or the like) as parameters. During traveling in the low-speed gear stage Lo, if the vehicle speed V exceeds an up-shift line of "Lo→Hi" from a low vehicle speed side to a high vehicle speed side or from a high required drive power to a low required drive power side, it is determined to be an up-shift and a gear shift is performed from the low-speed gear stage Lo to the high-speed gear stage Hi. During traveling in the high-speed gear stage Hi, if the vehicle speed V exceeds a down-shift line of "Lo←Hi" from the high vehicle speed side to the low vehicle speed side, it is determined to be a down-shift and a gear shift is performed from the high-speed gear stage Hi to the low-speed gear stage Lo. The up-shift line and the down-shift line are gear shift lines, and a predetermined hysteresis is provided between the lines. The up-shift and the down-shift are performed by switching the engagement and disengagement states of the brakes B1, B2 as shown in FIG. 2.

The gear shift control unit 92 further functionally includes a torque-down control unit 94 and a surplus power processing unit 100. The torque-down control unit 94 temporarily decreases the torque (MG2 torque) TMG2 of the second motor generator MG2 in the power-ON (drive state) up-shift and down-shift of the automatic transmission 26 during which the second motor generator MG2 is subjected to powering control, whereby these gear shifts are performed smoothly and quickly. For example, in a case of the power-ON up-shift, since the MG2 rotation speed NMG2 decreases with change in the gear shift ratio γs, the MG2 rotation speed NMG2 needs to decrease with the engagement torque of the brake B1 while disengaging the brake B2 by decreasing the hydraulic pressure; however, the torque-down control for temporarily decreasing the MG2 torque TMG2 is performed, whereby it is possible to quickly decrease the MG2 rotation speed NMG2 to establish the high-speed gear stage Hi. The power-ON up-shift is executed in a case where the vehicle speed exceeds the up-shift line with an increase in the vehicle speed V. In a case of the power-ON down-shift, since the MG2 rotation speed NMG2 increases with a change in the gear shift ratio γs, the brake B1 is disengaged by decreasing the hydraulic pressure. Accordingly, the MG2 rotation speed NMG2 increases with the torque TMG2 thereof and the brake B2 needs to be engaged at a synchronous rotation speed after a gear shift; however, the torque-down control for temporarily decreasing the MG2 torque TMG2 is performed immediately before the synchronous rotation speed is reached, whereby it is possible to quickly engage the brake B2 to establish the low-speed gear stage Lo while suppressing an overshoot of the MG2 rotation speed NMG2 or gear shift shock. The power-ON down-shift is executed in a case where the vehicle speed V exceeds the down-shift line, for example, on an uphill road or the like.

While the second motor generator MG2 is basically subjected to the powering control with power supply from the battery 48a, if the regenerative control is performed through the torque-down control, surplus power is generated in the power supply circuit 44 by regenerative power generated by the regenerative control. Even in a case where the torque-down control is performed within a range of powering torque, if power consumption rapidly decreases, the output (discharge) of the battery 48a may not follow change in power consumption and surplus power may be generated in the power supply circuit 44. Then, the voltage of the smoothing capacitor 54 which is provided in parallel with the MG2 inverter 42 may exceed an inverter withstand voltage due to surplus power. For this reason, in the related art, while measures that the down amount or the decrease rate of the MG2 torque TMG2 is restricted, or the smoothing capacitor 54 increases in capacity are taken, if the down amount or the decrease rate of the MG2 torque TMG2 is restricted, gear shift shock may occur or the gear shift time may be extended to cause damage to durability of frictional members. If the smoothing capacitor 54 increases in capacity, costs increase and mountability is deteriorated.

In contrast, in this example, the surplus power processing unit 100 makes the capacitor 48b absorb (store) surplus power generated in the power supply circuit 44 during the torque-down control. The surplus power processing unit 100 functionally includes a pre-gear shift determination unit 102, a capacitor storage amount restriction unit 104, and a map storage unit 106, and performs signal processing according to Steps S1 to S8 (hereinafter, simply referred to as S1 to S8) in the flowchart of FIG. 4. S2 of FIG. 4 corresponds to the pre-gear shift determination unit 102, and S3 and S4 correspond to the capacitor storage amount restriction unit 104.

Figure 4:
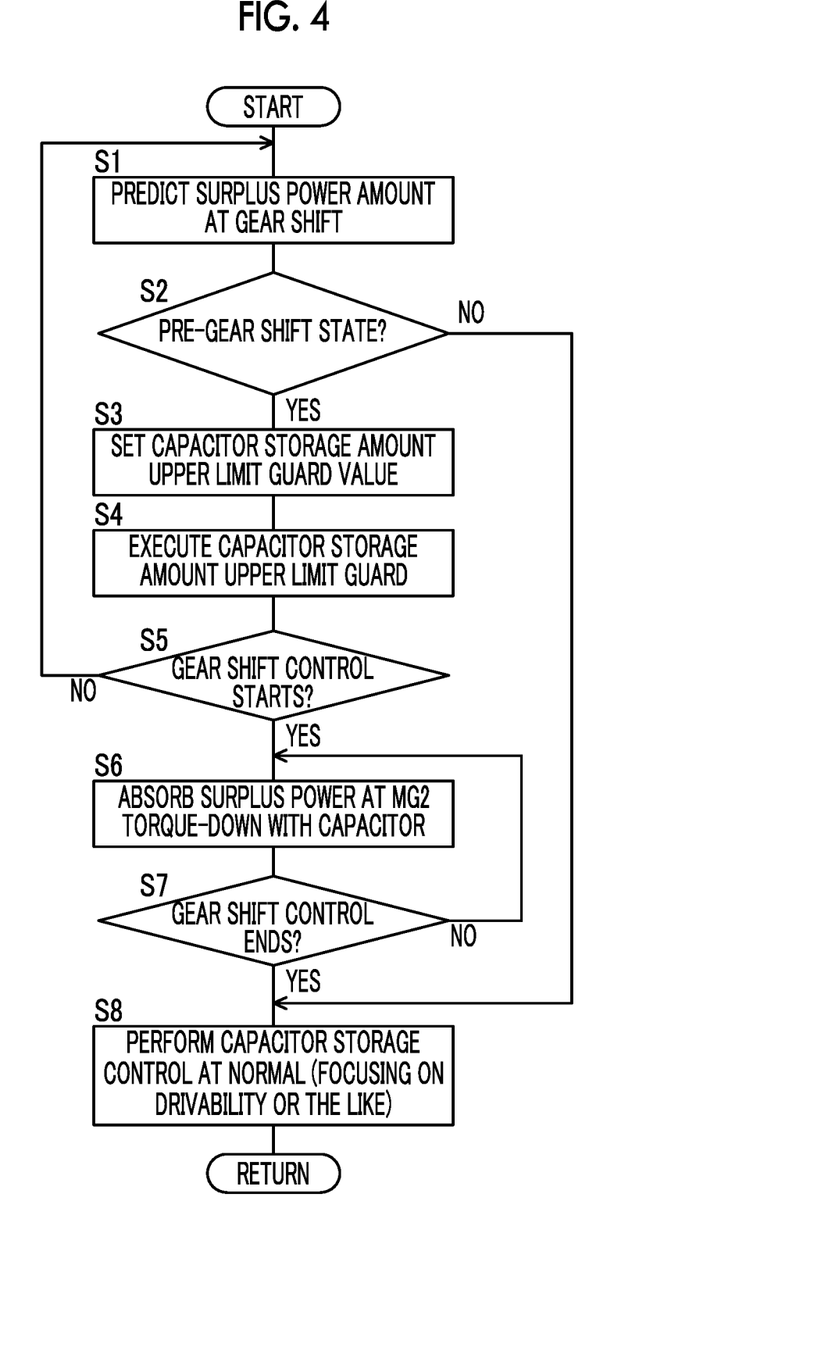
FIG. 4 is a flowchart specifically illustrating the operation of a surplus power processing unit of FIG. 3.

In S1 of FIG. 4, the amount of surplus power generated in the power supply circuit 44 due to the torque-down control in the gear shift is predicted. For example, in a case where the regenerative control is performed during the torque-down control, the amount of regenerative power generated by the regenerative control is predicted. In a case where the torque-down control is performed within a range of powering torque, the amount of decrease in power consumption of the second motor generator MG2 is predicted. That is, if the vehicle is traveling in the power-ON low-speed gear stage Lo, the amount of regenerative power due to the torque-down control in the up-shift or the power consumption decrease amount is predicted, and if the vehicle is traveling in the power-ON high-speed gear stage Lo, the amount of regenerative power due to the torque-down control in the down-shift or the power consumption decrease amount is predicted. The amount of surplus power according to the regenerative power or the decrease in power consumption may be set to a given value determined in advance for each type of gear shift, for example, by an experiment, a simulation, or the like, or the MG2 rotation speed NMG2 at the time of the gear shift may be predicted and the amount of surplus power may be determined by calculating from the torque-down amount, the MG2 torque TMG2, or the like. Since the power consumption decrease amount increases in a case where the MG2 rotation speed NMG2 is high and the torque-down amount is large, it is preferable that a value where a product thereof becomes the maximum is used. The operation point (rotation speed NMG2 and the torque TMG2) of the second motor generator MG2 at the time of the gear shift may be predicted from the driver's required drive power (accelerator operation amount Acc or the like) and the vehicle speed V, the maximum amount of regenerative power or the maximum power consumption decrease amount at the operation point may be sequentially calculated from the torque-down amount. The amount of regenerative power and the power consumption decrease amount may be added and set as the amount of surplus power. The amount of surplus power corresponds to a necessary free capacity SOC2$rq$ of the capacitor 48$b$. In a case of calculating the amount of surplus power, that is, the necessary free capacity SOC2$rq$ from a map or the like according to the operation state or the like, S1 can be regarded as a calculation unit of the necessary free capacity SOC2$rq$.

In S2, it is determined whether or not the automatic transmission 26 is in the pre-gear shift state determined in advance immediately before the gear shift of the automatic transmission 26. Specifically, for example, as shown in FIG. 5, it is determined whether or not the vehicle speed V and the required drive power fall within a range of a capacitor storage amount restriction region A or B (hatched portion) set adjacent to the gear shift line (up-shift line and down-shift line) determined in advance with the vehicle speed V and the required drive power as parameters. The capacitor storage amount restriction region A in a case of a down-shift is set on a high vehicle speed side of the down-shift line, and the capacitor storage amount restriction region B in a case of an up-shift is set on a low vehicle speed side of the up-shift line. The capacitor storage amount restriction regions A, B are provided to secure a predetermined free capacity in the capacitor 48$b$ before the gear shift (strictly, before the torque-down control is performed). While the free capacity may be secured in a comparatively early stage before the gear shift, if the use restriction of the capacitor 48$b$ is considered, it is preferable that the time (narrow region) is as short as possible within a range capable of securing the free capacity. For this reason, for example, a required time necessary for securing the predetermined free capacity is calculated based on the dischargeable amount per unit time of the capacitor 48$b$, and a required time until reaching the gear shift line or until the torque-down control is performed is calculated based on the drive power, the vehicle weight, and the like, whereby a minimum region capable of securing the predetermined free capacity through discharging is determined in advance. While the capacitor storage amount restriction regions A, B may be set variably according to the amount of surplus power determined in S1, that is, the necessary free capacity SOC2$rq$, the current free capacity, and the like, in this example, given regions are respectively determined according to the maximum necessary free capacity. The capacitor storage amount restriction regions A, B correspond to a pre-gear shift region, and are stored in the map storage unit 106.

In S2, as another determination method, it may be sequentially determined whether or not the automatic transmission 26 is in the pre-gear shift state based on the operation state, such as change in vehicle speed (acceleration/deceleration) or the rate of change in the accelerator operation mount Acc. For example, a required time Ta until reaching the gear shift line (the up-shift line or the down-shift line) or until the torque-down control is performed may be calculated from the rate of change in the vehicle speed V, the rate of change in the accelerator operation amount Acc, or the like, and in a case where the required time Ta becomes equal to or less than a free capacity securing time Tb necessary for securing the predetermined free capacity in the capacitor 48$b$, it may be determined that the automatic transmission 26 is in the pre-gear shift state. While the free capacity securing time Tb may be set to a given value determined in advance according to the dischargeable amount per unit time of the capacitor 48$b$ and the maximum necessary free capacity, the free capacity securing time Tb may be determined by sequential calculation using the amount of surplus power determined in S1, that is, the necessary free capacity SOC2$rq$, the current free capacity, and the like. The current free capacity can be determined, for example, by subtracting a current storage residual amount SOC2 from a capacitor storage amount maximum value SOC2max (design value or the like) determined in advance.

Then, in a case where the determination in S2 described above is YES (affirmative), that is, in a case where it is determined that the automatic transmission 26 is in the pre-gear shift state, the processing after S3 is executed. Meanwhile, in a case where the determination in S2 is NO (negative), S8 is executed. In S8, normal capacitor storage control focusing on drivability or the like is performed. Specifically, charging/discharging control is performed such that a charging state determined according to drivability or the like is brought without performing the storage amount restriction of the capacitor 48$b$.

Figure 6:
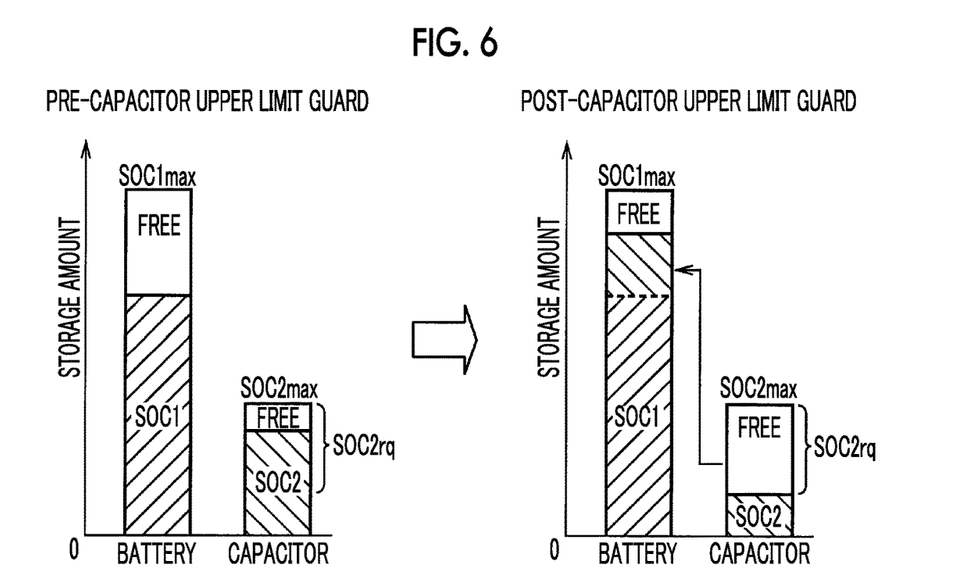
FIG. 6 is a diagram illustrating an example of a discharging method when executing a capacitor storage amount upper limit guard in Step S4 of FIG. 4.

In S3 which is executed in a case where it is determined in S2 that the automatic transmission 26 is in the pre-gear shift state, a capacitor storage amount upper limit guard value SOC2$gd$ is set. Specifically, as shown in Expression (1) described below, the storage amount upper limit guard value SOC2$gd$ is calculated by subtracting the necessary free capacity SOC2$rq$ determined in S1 from the capacitor storage amount maximum value SOC2max. Next, in S4, an upper limit guard is executed such that the capacitor storage residual amount SOC2 becomes equal to or less than the storage amount upper limit guard value SOC2$gd$. Specifically, the chargeable upper limit value of the capacitor 48$b$ decreases from the capacitor storage amount maximum value SOC2max to the storage amount upper limit guard value SOC2$gd$, and in a case where the capacitor storage residual amount SOC2 is greater than the storage amount upper limit guard value SOC2$gd$, the switching control unit 50 is switched to discharge excess power from the capacitor 48$b$. The discharging is executed by moving excess power from the capacitor 48$b$ to the battery 48$a$, for example, in a case where the battery 48$a$ has a sufficient free capacity as shown in FIG. 6. In a case where the battery 48$a$ has no sufficient free capacity, for example, electric power is discharged while being supplied from the capacitor 48$b$ to the second motor generator MG2 during the powering control and discharged, or electric power is discharged while being supplied to accessories, such as an air conditioner, whereby the capacitor storage residual amount SOC2 quickly becomes equal to or less than the storage amount upper limit guard value SOC2$gd$. With this, the necessary free capacity SOC2$rq$ is quickly secured in the capacitor 48$b$. The capacitor storage amount restriction unit 104 which executes S3 and S4 functions as a free capacity securing control unit. In a case where the capacitor storage residual amount SOC2 becomes equal to or less than the storage amount upper limit guard value SOC2gd, the normal charging/discharging control focusing on drivability or the like is continued within a range not exceeding the storage amount upper limit guard value SOC2gd.

$$SOC2gd=SOC2max-SOC2rq \qquad (1)$$

Figure 7:
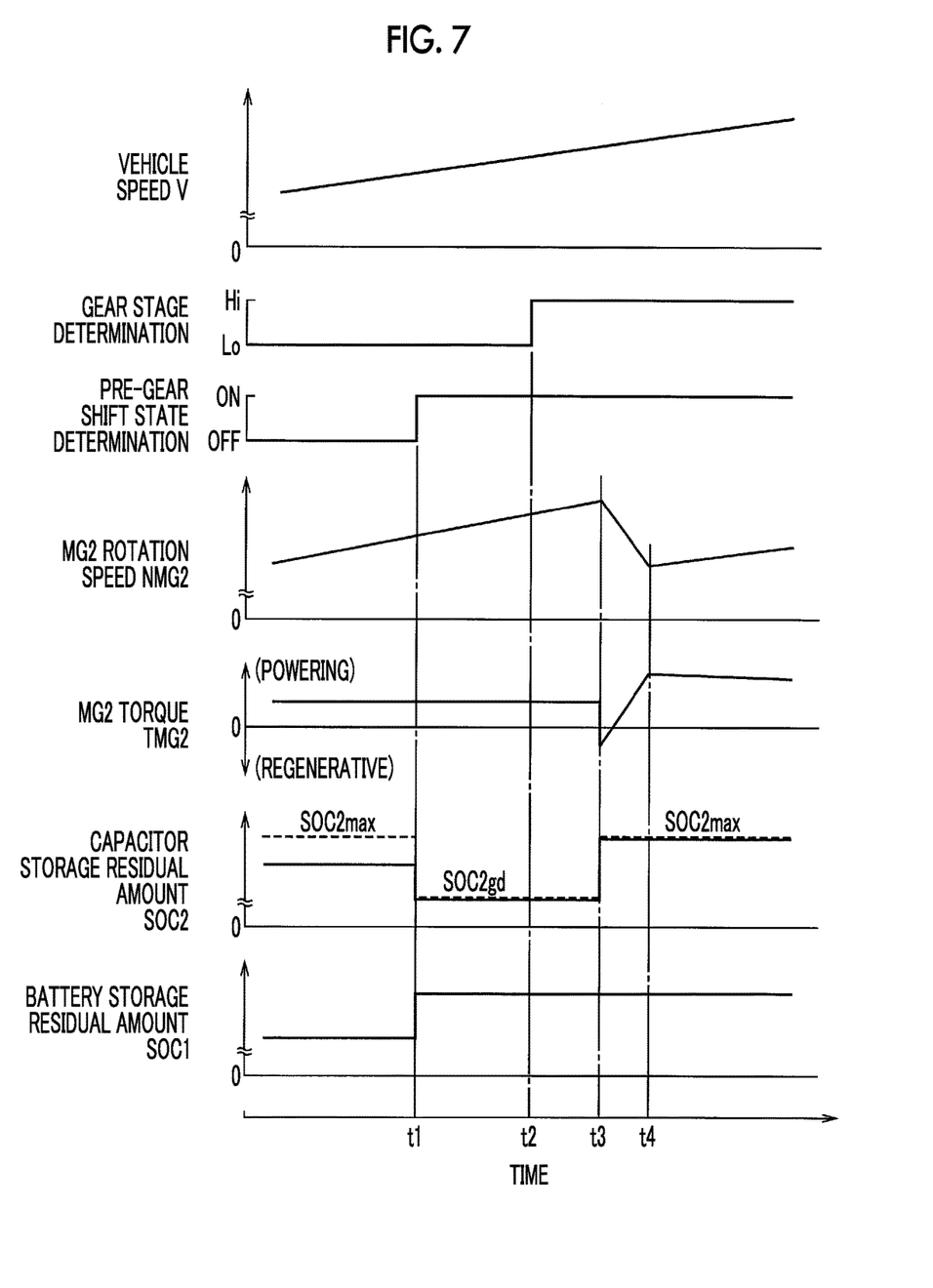
FIG. 7 is an example of a time chart in a case where surplus power processing is performed according to the flowchart of FIG. 4 in a power-ON up-shift during which torque-down control is performed.

FIG. 7 is an example of a time chart showing changes of the respective units in a case where surplus power processing is performed according to the flowchart of FIG. 4 when the automatic transmission 26 is up-shifted. In FIG. 7, the time t1 is the time at which it is determined that the automatic transmission 26 is in the pre-gear shift state, for example, from the map of the capacitor storage amount restriction region B shown in FIG. 5 with an increase in the vehicle speed V and the determination in S2 is YES, and in S4, excess power is moved from the capacitor 48b to the battery 48a such that the capacitor storage residual amount SOC2 becomes equal to or less than the storage amount upper limit guard value SOC2gd, whereby the necessary free capacity SOC2rq is secured in the capacitor 48b. Both of the capacitor storage amount maximum value SOC2max and the storage amount upper limit guard value SOC2gd indicated by broken lines in the graph of the capacitor storage residual amount SOC2 corresponds to a chargeable upper limit value.

Returning to FIG. 4, next, in S5, it is determined whether or not gear shift control is started when the gear shift is determined by the gear shift map or the like. While the processing after S1 is repeatedly executed until the gear shift control is started, the processing after S6 is executed after the gear shift control is started. The processing after S1 is repeatedly executed, the necessary free capacity SOC2rq of the capacitor 48b or the storage amount upper limit guard value SOC2gd is sequentially updated based on the latest operation state. The necessary free capacity SOC2rq and the storage amount upper limit guard value SOC2gd when the determination in S2 is YES for the first time may be maintained as they are.

In S6 which is executed in a case where the gear shift control is started, it is determined whether or not the torque-down control is started by the torque-down control unit 94, and after the torque-down control is started, surplus power generated in the power supply circuit 44 can be quickly absorbed by the capacitor 48b. That is, the storage amount upper limit guard value SOC2gd of the capacitor 48b is eliminated, and the switching control unit 50 is switched to make the capacitor 48b chargeable. The time t2 of FIG. 7 is the time at which the up-shift is determined and the gear shift control of the up-shift, specifically, hydraulic control for disengaging the brake B2 and engaging the brake B1 is started. The time t3 is the time at which the torque-down control is started, and surplus power generated in the power supply circuit 44 due to the torque-down control is quickly absorbed (stored) by the capacitor 48b. In the time chart of FIG. 7, in a case where the second motor generator MG2 is subjected to the regenerative control through the torque-down control in the gear shift, the MG2 torque TMG2 changes to the regenerative torque side, and regenerative power (surplus power) generated by the regenerative control is quickly absorbed by the capacitor 48b.

Next, in S7, it is determined whether or not the gear shift control ends, and S6 is repeatedly executed until the gear shift control ends. After the gear shift control ends, S8 is executed, and the normal capacitor storage control focusing on drivability or the like is returned. The time t4 of FIG. 7 is the time at which the MG2 rotation speed NMG2 decreases to the synchronous rotation speed after the up-shift, the brake B1 is completely engaged, and accordingly, the gear shift control ends. The second motor generator MG2 is maintained at given power until the gear shift control ends after the torque-down control is performed, and the MG2 torque TMG2 increases with a decrease in the MG2 rotation speed NMG2.

In this way, in the hybrid vehicle 10 of this example, the surplus power processing unit 100 is provided, it is determined whether or not the automatic transmission 26 is in the pre-gear shift state determined in advance prior to the power-ON up-shift and down-shift in which the torque-down control is performed, specifically, it is determined whether or not the vehicle speed V and the required drive power fall within a range of the capacitor storage amount restriction region A or B shown in FIG. 5, and in a case where it is determined that the automatic transmission 26 is in the pre-gear shift state, the necessary free capacity SOC2rq is secured in the capacitor 48b. For this reason, even in a case where the torque-down control of the second motor generator MG2 is performed in the gear shift, and surplus power is generated in the power supply circuit 44 due to the torque-down control, surplus power can be quickly absorbed using the capacitor 48b. With this, it is not necessary to increase the capacity of the smoothing capacitor 54, and it is possible to relax or eliminate the restriction to the down amount or the decrease rate of the MG2 torque TMG2 during the torque-down control can be relaxed or eliminated, and to appropriately perform the gear shift control so as to prevent deterioration of durability of frictional members even if gear shift shock occurs or the gear shift time is extended.

Since the necessary free capacity SOC2rq is secured in the capacitor 48b by determining whether or not the automatic transmission 26 is in the pre-gear shift state, the predetermined free capacity does not need to be constantly secured, the capacitor storage control focusing on drivability or the like can be performed normally, and the capacitor 48b can be sufficiently charged. That is, the temporal use restriction of the capacitor 48b is minimized, and for example, large assist torque can be quickly generated by supplying electric power from the capacitor 48b to the second motor generator MG2 with high output at the time of start, rapid acceleration, or the like. In this way, the characteristics of the rapidly chargeable/dischargeable capacitor 48b are utilized appropriately for various other purposes.

Since the map of the capacitor storage amount restriction regions A, B set adjacent to the gear shift line (the up-shift line and the down-shift line) is provided, and it is determined that the automatic transmission 26 is in the pre-gear shift state in a case where the vehicle speed V and the required drive power fall within a range of the capacitor storage amount restriction regions A, B, it is possible to determine the pre-gear shift state easily and reliably, and to appropriately secure the necessary free capacity SOC2rq before the gear shift (strictly, before the torque-down control is performed).

Since the storage amount upper limit guard value SOC2gd is set according to the necessary free capacity SOC2rq and the chargeable upper limit value of the capacitor 48b decreases to the storage amount upper limit guard value SOC2gd in order to secure the necessary free capacity SOC2rq, in a case where the capacitor storage residual amount SOC2 is small originally, wasteful discharging or the like is not performed.

Since the capacitor 48b is discharged as necessary in order to secure necessary free capacity SOC2rq, it is possible to quickly secure the necessary free capacity SOC2rq. With this, it is possible to further relax the temporal use restriction of the capacitor 48b.

Next, another example of the present disclosure will be described. In the following example, portions substantially common to the foregoing example are represented by the same reference numerals, and detailed description thereof will not be repeated.

Figure 8:
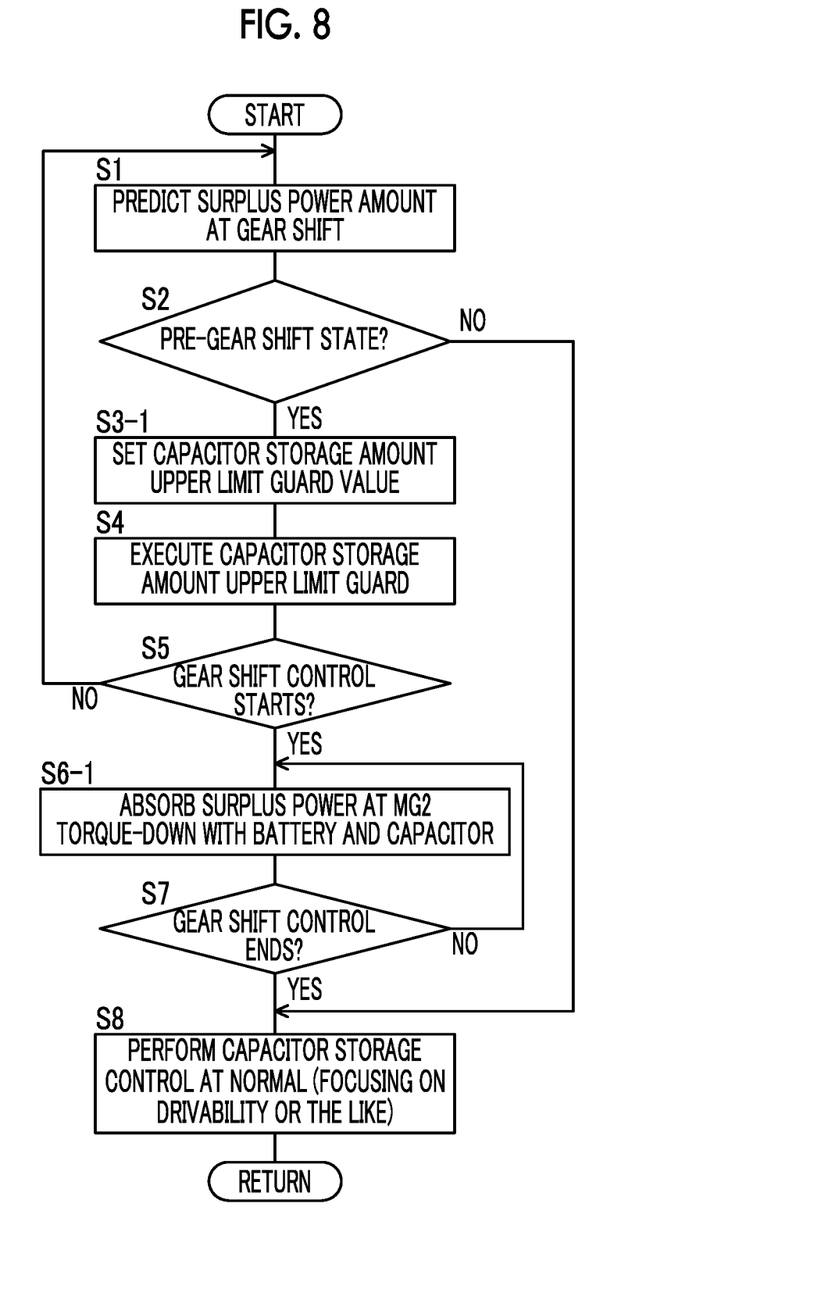
FIG. 8 is a diagram illustrating another example, and is a flowchart corresponding to FIG. 4.

FIG. 8 is a flowchart corresponding to FIG. 4 described above, and Steps S3-1 and S6-1 are different from FIG. 4. That is, in this example, the second motor generator MG2 is subjected to regenerative control through torque-down control in a gear shift, and surplus power (regenerative power) generated in the power supply circuit 44 due to the regenerative control is absorbed using both of the battery 48a and the capacitor 48b. In S3-1, the amount of surplus power which is chargeable in the battery 48a within a predetermined short period of time corresponding to a charging time by the capacitor 48b is calculated based on the charging performance and the free capacity of the battery 48a and is subtracted from the amount of surplus power determined in S1, thereby calculating the necessary free capacity SOC2rq of the capacitor 48b. Then, in S6-1, surplus power is absorbed using both of the battery 48a and the capacitor 48b. In this case, the necessary free capacity SOC2rq of the capacitor 48b can be reduced by an amount that the battery 48a can absorb, and a quantitative use restriction of the capacitor 48b is relaxed. Since the charging rate of the battery 48a is low, surplus power which can be absorbed by the battery 48a is limited; however, if surplus power becomes small even slightly, the necessary free capacity SOC2rq can be reduced.

Figure 9:
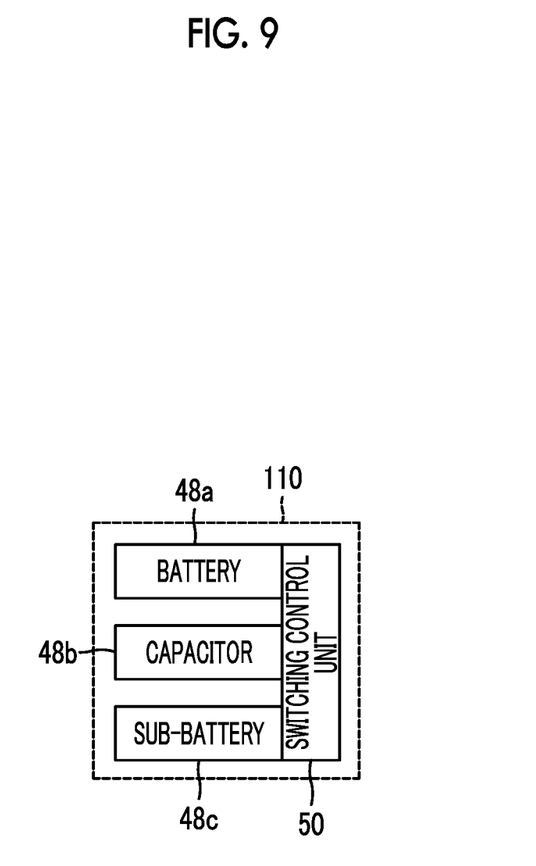
FIG. 9 is a diagram illustrating an example of a power storage device in a case where a sub-battery is provided in addition to a main battery.

While the example of FIG. 8 described above is a case where surplus power is absorbed using the main battery 48a, like a power storage device 110 of FIG. 9, in a case where a sub-battery 48c is further provided in addition to the battery 48a and the capacitor 48b, surplus power of the power supply circuit 44 can be absorbed using both of the sub-battery 48c and the capacitor 48b. Similarly to the battery 48a, the sub-battery 48c is a lead battery, a lithium-ion battery, a nickel-hydrogen battery, or the like, and as in the example of FIG. 8, the necessary free capacity SOC2rq of the capacitor 48b may be determined in consideration of the charging performance and the free capacity of the sub-battery 48c; thus, the necessary free capacity SOC2rq can be reduced by an amount that the sub-battery 48c can absorb, and a quantitative use restriction of the capacitor 48b is relaxed. Since the sub-battery 48c can be charged regardless of the operation state of the main battery 48a, surplus power can be absorbed using the sub-battery 48c even when the battery 48a is discharged. The sub-battery 48c corresponds to a third power storage device.

Although the examples of the present disclosure have been described above in detail based on the drawings, the examples are mere example embodiments, and the embodiments can be carried out in aspects to which various modifications and improvements are added based on knowledge of those skilled in the art.

What is claimed is:

1. A control device for a vehicle, the vehicle including an electric motor as a drive power source for traveling, an automatic transmission provided between the electric motor and drive wheels, and a power storage device provided in a power supply circuit of the electric motor and configured to be chargeable and dischargeable, and the power storage device including a battery and a rapid power storage device configured to be chargeable and dischargeable rapider than the battery, the control device comprising:
an electronic control unit configured to:
i) perform torque-down control for decreasing torque of the electric motor in a gear shift of the automatic transmission,
ii) determine whether or not the automatic transmission is in a pre-gear shift state before the torque-down control is performed in the gear shift of the automatic transmission, and
iii) in a case where the electronic control unit determines that the automatic transmission is in the pre-gear shift state, execute control for securing a predetermined free capacity in the rapid power storage device in order to absorb surplus power generated in the power supply circuit due to the torque-down control using the rapid power storage device.

2. The control device according to claim 1,
wherein the electronic control unit has a map of a pre-gear shift region set adjacent to a gear shift line determined with a vehicle speed and a required drive power as parameters, and
the electronic control unit is configured to determine that the automatic transmission is in the pre-gear shift state when the vehicle speed and the required drive power fall within a range of the pre-gear shift region.

3. The control device according to claim 1,
wherein the electronic control unit is configured to perform control such that a chargeable upper limit value of the rapid power storage device decreases in order to secure the free capacity.

4. The control device according to claim 1,
wherein the electronic control unit is configured to perform control such that the rapid power storage device is discharged in order to secure the free capacity.

5. The control device according to claim 1,
wherein the electronic control unit is configured to set the free capacity of the rapid power storage device based on a charging performance and the free capacity of the battery in order to absorb the surplus power of the power supply circuit using both of the battery and the rapid power storage device.

6. The control device according to claim 1,
wherein the power storage device includes a third power storage device in addition to the battery and the rapid power storage device, and
the electronic control unit is configured to set the free capacity of the rapid power storage device based on a charging performance and the free capacity of the third power storage device in order to absorb the surplus power of the power supply circuit using both of the third power storage device and the rapid power storage device.

* * * * *